United States Patent [19]

Burrer

[11] Patent Number: 4,902,893
[45] Date of Patent: Feb. 20, 1990

[54] PASSIVE INFRARED RADIATION SCANNING SYSTEM

[76] Inventor: Gordon J. Burrer, 5 Wayland Hills Rd., Wayland, Mass. 01778

[21] Appl. No.: 388,763

[22] Filed: Aug. 2, 1989

Related U.S. Application Data

[63] Continuation of Ser. No. 183,834, Apr. 20, 1988, abandoned.

[51] Int. Cl.$^4$ .......................... G02B 26/10; H04N 5/33
[52] U.S. Cl. .................... 250/334; 250/252.1; 350/6.6
[58] Field of Search .................... 350/6.6, 6.7, 6.8, 6.5, 350/6.91; 250/334, 337, 235, 236, 252.1; 358/208

[56] References Cited

U.S. PATENT DOCUMENTS

| | | | |
|---|---|---|---|
| 3,324,844 | 2/1966 | Fain et al. | 250/235 |
| 3,437,393 | 4/1969 | Baker et al. | 358/208 |
| 3,614,312 | 10/1971 | Fournier et al. | 358/208 |
| 3,704,342 | 11/1982 | Stoddard et al. | 178/6.8 |
| 3,804,976 | 4/1974 | Gard | 178/6.8 |
| 3,895,182 | 7/1975 | Trilling | 178/6.8 |
| 3,909,105 | 9/1975 | Neiswander et al. | 250/236 |
| 3,978,281 | 8/1976 | Burrer | 358/208 |
| 4,170,398 | 10/1979 | Koester | 350/6.8 |
| 4,210,810 | 7/1980 | Berry et al. | 250/347 |
| 4,251,125 | 2/1981 | Minoura et al. | 350/6.5 |
| 4,296,325 | 10/1981 | Berry | 250/347 |
| 4,299,438 | 11/1981 | Minoura | 350/6.8 |
| 4,508,422 | 4/1985 | Karlsson | 350/6.8 |
| 4,571,623 | 11/1986 | Schoon | 250/234 |
| 4,686,363 | 8/1987 | Schoon | 250/235 |
| 4,704,521 | 11/1987 | Loy | 350/6.8 |
| 4,710,621 | 12/1987 | Loy | 350/6.8 |

Primary Examiner—Jon W. Henry
Attorney, Agent, or Firm—Weingarten, Schurgin, Gagnebin & Hayes

[57] ABSTRACT

A radiation scanning system comprises scan mirrors optically coupled together by means of a spherical reflector to relay the scan mirror pupils through the optical path with minimal pupil shift for both wide and narrow field-of-view applications. The mirrors may oscillate at a predetermined fundamental frequency and a hamonic thereof to achieve near linear line scans or both line scan mirrors may oscillate at the predetermined fundamental frequency to achieve wider scan angles. In another embodiment, a line scan mirror is mounted on a multi-mode resonant scanner and phase lock oscillated at multiple frequencies while a second scan mirror functions as the field or line scanning element. In yet another embodiment, one line scan mirror is mounted on a non-turnable resonant scanner while a second scan mirror functions as the field scanning element. General compatibility with TV formatted systems can be achieved through self resonance or by controlling the fundamental line scan frequency through an external master clock. The line scan mirrors can operate at a predetermined fundamental frequency which is a fraction of the standard TV line frequency. System scanners may be passive, active or combinations thereof, and can operate in the ultraviolet, visible, or infrared spectrums.

20 Claims, 5 Drawing Sheets

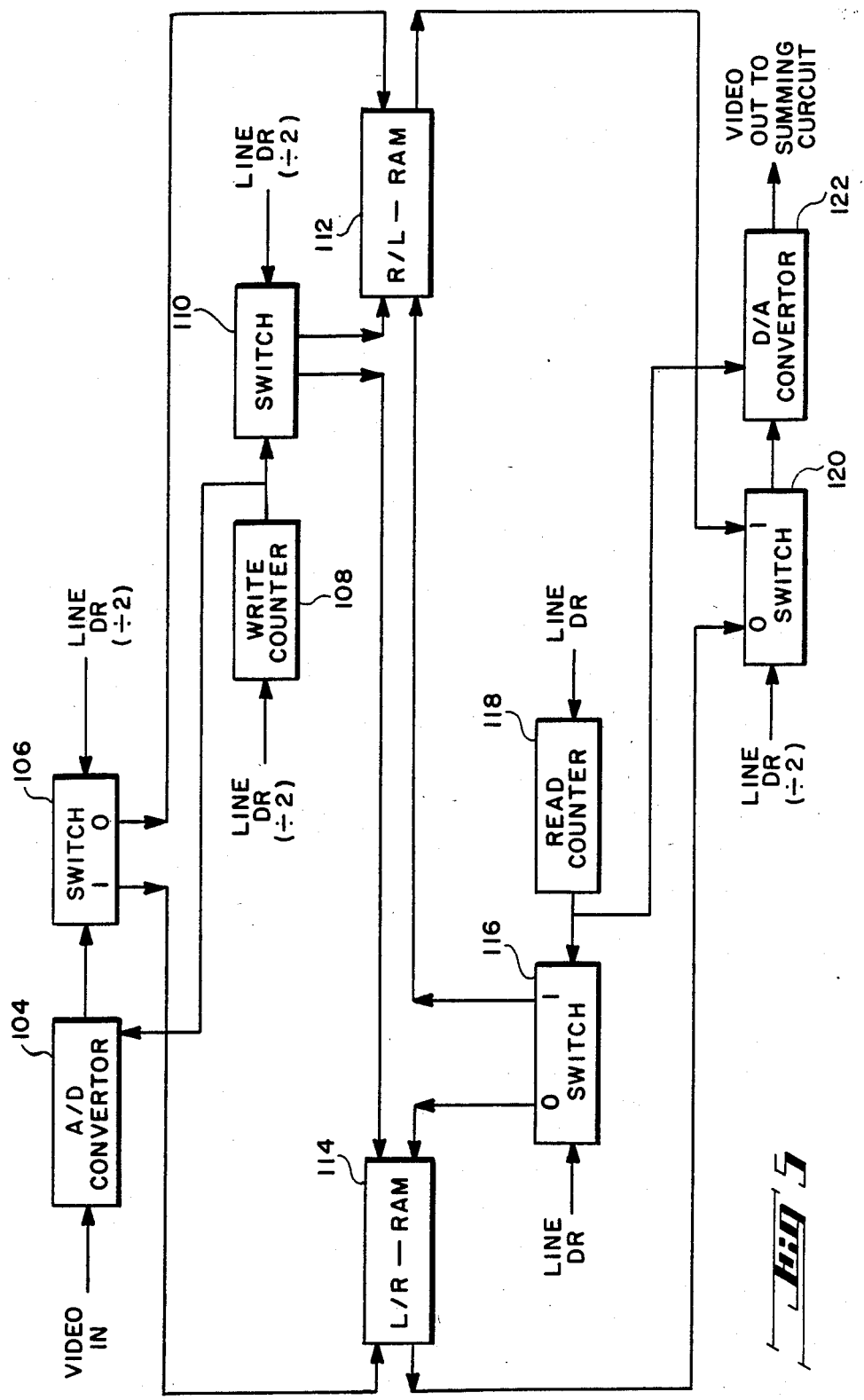

PASSIVE INFRARED RADIATION SCANNING SYSTEM

This application is a continuation of application Ser. No. 07/183,834, filed Apr. 20, 1988, now abandoned.

FIELD OF THE INVENTION

This invention relates to radiation scanning systems, and more particularly to radiation scanning systems wherein pairs of scan mirrors are optically coupled together by means of a spherical reflector.

BACKGROUND OF THE INVENTION

Flat mirrors mounted on resonant torsional galvanometers, as illustrated in U.S. Pat. No. 3,978,281, are frequently employed as the scanning means in TV compatible radiation scanning systems. Resonant mechanical scanners are highly reliable with an almost indefinite maintenance-free service and shelf life, and are also relatively low in cost and power consumption. Resonant mechanical scanners in general, however, have some inherent limitations which degrade the efficiency of radiation scanning systems.

Firstly, scanning is accomplished at a sinusoidal rate, resulting in non-linear scanning near the scan angle limits which reduces the overall scan efficiency of the system. In passive scanning systems, moreover, the sinusoidal scan rate restricts the choice of usable detector configurations, thereby limiting the system's thermal sensitivity. In active scanning systems, the sinusoidal scan rate can cause undesirable variations in image exposure time. Secondly, non-tunable resonant scanners are operated to scan at the inherent resonant frequencies defined by the physically resonant elements of the scanners. Lastly, for applications wherein the scanning system must cover the largest possible field-of-view or scan angle, pupil shift must be reduced or eliminated to minimize scan mirror mass and associated torsion rod stress.

Resonant mechanical scanners which are tunable over a predetermined frequency range centered about the resonant frequency are now available for use in radiation scanning systems. The mechanical spring element of the tunable scanner may be fabricated from a material having a variable modulus of elasticity. The modulus may be varied by temperature using material such as 0.83% carbon steel or Nitinol, a nickel-titanium alloy, to form a thermally tunable scanner.

The modulus can also be varied by magnetic, electromagnetic or electrical energy using material appropriately reactive to the particular energy form. Alternatively, an electronically tunable magnetic spring may be coupled in series with the mechanical spring element of the scanner. In some cases it is desirable to phase lock the scanners by electrically driving them at a frequency slightly off of the mechanical resonance frequency.

SUMMARY OF THE INVENTION

One or more tunable resonant scanners can be operated to produce near linear line scans or alternatively to increase the system scan angle. This invention utilizes a spherical reflector as a subsystem element of the optical configuration to optically couple incident radiation between oscillating scan mirrors with minimal pupil shift for wide and narrow field-of-view applications.

One disclosed embodiment utilizes a single spherical reflector to optically couple incident radiation reflected from a field scan mirror between a pair of cascaded line scan mirrors. The pair of cascaded line scan mirrors are mounted on tunable resonant scanners and phase lock tuned. The two line scan mirrors can both oscillate at a predetermined fundamental frequency to permit the radiation scanning system to scan through larger angles. Alternatively, one line scan mirror can oscillate at the fundamental frequency while the other line scan mirror oscillates at a predetermined harmonic of the fundamental frequency such that the radiation scanning system achieves near linear line scans.

Another disclosed embodiment includes the field scan mirror, a single spherical reflector and a pair of cascaded line scan mirrors operating as described in the preceding paragraph and further includes a slotted folding mirror interposed intermediate the spherical reflector and the line scan mirrors.

Still another disclosed embodiment includes two scan mirrors optically coupled together by means of a spherical reflector in optical configurations such that the second scan mirror functions as the field scanning element. In this embodiment the line scan mirror can function as either a single or multi-mode resonant scanner. The multi-mode line scanner utilizes phase locked oscillations at multiple frequencies to achieve near linear line scans. The pupil of the line scan is relayed to the field scan mirror through the spherical reflector with minimal pupil shift.

Yet another disclosed embodiment includes a multiple spherical reflector subsystem for optical coupling between four cascaded line scan mirrors. The cascaded line scan mirrors are operated at the predetermined fundamental frequency and a selected harmonic thereof. The spherical reflectors are interposed to optically couple radiation between optically adjacent line scan mirrors.

Since the resonant scanners utilized in the optical configurations of this invention are for the most part tuneable, the radiation scanning system can be readily slaved to an external master clock. The radiation scanning system of the present invention is well suited for use with TV compatible infrared radiometers, TV compatible infrared night vision systems, active TV compatible hazardous gas detection systems, large screen TV projection systems, and TV or non-TV compatible laser printers. The optical configuration of the invention can also be used for line scanning system applications which eliminates the need for the field scan mirror in the described embodiments.

BRIEF DESCRIPTION OF THE DRAWINGS

A more complete understanding of the present invention and the attendant advantages and features thereof will be more readily understood by reference to the following detailed description when considered in conjunction with the accompanying drawings wherein:

FIG. 5 is a block diagram of a circuit for converting the bi-directional line scans generated by the radiation scanning system according to the present invention to uni-directional line scans compatible for display on conventional TV systems.

DETAILED DESCRIPTION OF PREFERRED EMBODIMENTS

Figure 1:
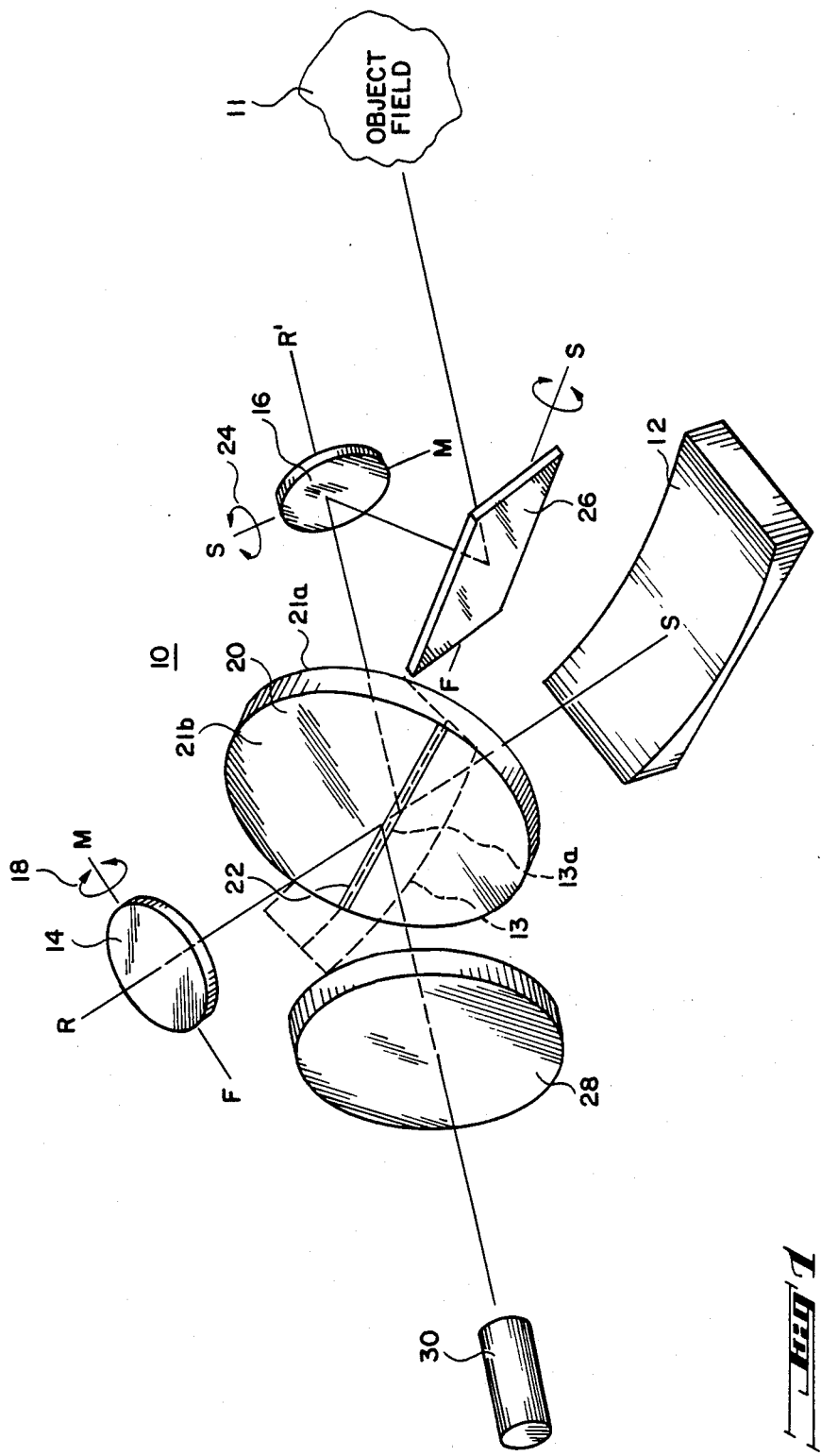
FIG. 1 is a diagrammatic view of one embodiment of an optical configuration for a radiation scanning system according to the present invention.

Referring now to the drawings wherein like reference numerals designate corresponding or similar elements throughout the several views, there is shown generally in FIG. 1 a diagrammatic view of the optical configuration for a radiation scanning system 10 for scanning and imaging an object field 11. The scanning system 10 comprises tunable resonant scanners forming a cascaded line scan mirror system coupled through a spherical reflector subsystem.

The radiation scanning system 10 uses a spherical reflector 12 to relay the pupils of the scan mirrors without pupil shift. The spherical reflector 12 is designed to have a predetermined center of curvature and a predetermined radius of curvature. The spherical reflector 12 also includes direct and reflected optical axes, the direct optical axis coincident with the line R'S and the reflected (from one reflecting surface of a slotted folding mirror 20) optical axis coincident with line R'S, coincident with the principal axis of the spherical reflector 12, as illustrated in FIG. 1. The spherical reflector 12 has a substantially spherical focal surface as represented generally by element 13, the spherical focal surface 13 including an intermediate focal line 13a of predetermined de minimus width as described hereinbelow in more detail.

The scanning system 10 of FIG. 1 employs a pair of line scan mirrors, a first line scan mirror 14 and a second line scan mirror 16, which are mounted on tunable resonant scanners. Positionally, the reflecting surface of the first line scan mirror 14 can be visualized as being located in a plane orthogonal, at the midpoint of the scan angle or field-of-view (FOV) of the mirror, to the direct optical axis R'S.

The reflecting surface of the second line scan mirror 16, however, is not orthogonal to the reflected optical axis R'S. The reflecting surface is perpendicular to the reflected optical axis R'S in the direction of rotation at the midpoint scan position, but the axis of rotation SM of the second line scan mirror 16 is canted from perpendicularity to the reflected optical axis R'S by several degrees so that incident radiation from a field scanning element 26 is reflected so as to intercept the surface of the spherical reflector 12. The reflecting surfaces of the first and second line scan mirrors 14, 16, respectively, are positioned a predetermined distance from the spherical reflector 12 equal to the radius of curvature thereof.

As shown in FIG. 1, the first line scan mirror 14 has a rotational axis FM about which the mirror 14 oscillates. The scan angle oscillation of the first line scan mirror 14 at a predetermined fundamental frequency $F_f$ and scan amplitude $A_f$ is exemplarily illustrated by arrow 18. The rotational axis FM of the first line scan mirror 14 is disposed orthogonally to the optical axis R'S of the spherical reflector 12 to achieve near distortion free scanning.

A slotted folding mirror 20 has opposed, planar reflecting surfaces 21a, 21b and a narrow slot 22 extending therethrough between the reflecting surfaces. The slotted folding mirror 20 is positioned on the optical axis R'S between the first line scan mirror 14 and the spherical reflector 12. The slotted folding mirror 20 is disposed so that the intermediate focal line 13a of the spherical reflector 12 is coincident with or closely adjacent to the narrow slot 22 of the slotted folding mirror 20.

The first line scan mirror 14 is centered on the optical axis R'S of the spherical reflector 12 at a distance equal to the radius of curvature of the spherical reflector 12. The first line scan mirror 14 is disposed so that the narrow slot 22 of the slotted folding mirror 20 is scanned during oscillation about the rotational axis FM. In radiometric applications a radiance reference source (not shown) can be disposed at both ends of the narrow slot 22.

The second line scan mirror 16 has a rotational axis SM and oscillates thereabout at a selected frequency $F_s$ as exemplarily illustrated by arrow 24. The selected frequency $F_s$ may be a harmonic of the predetermined fundamental frequency $F_f$ to achieve near linear line scans. The amplitude $A_s$ of the secondary oscillation is significantly less than the amplitude $A_f$ of the fundamental oscillation.

Because of the smaller amplitude $A_s$ of the secondary oscillation, the rotational axis SM of the second line scan mirror 16 can readily be canted some 30 degrees off orthogonality from the reflected optical axis R'S of the spherical reflector 12 with insignificant distortion of the object field 11. The second line scan mirror 16 is centered on the reflected optical axis R'S at a distance equal to the radius of curvature from the spherical reflector 12.

The first line scan mirror 14 and the second line scan mirror 16 are phase locked wherein the predetermined amplitude $A_f$ of the predetermined fundamental frequency $F_f$ is combined with the predetermined amplitude $A_s$ of the selected frequency $F_s$. The net effect is that the radiation scanning system 10 produces line scans of the object field 11 at a near constant line scan rate, i.e., as if the object field 11 were scanned by a single scanner driven to provide a substantially triangular waveform, when the second line scan mirror 16 is oscillated at a selected frequency $F_s$ which is a harmonic of the predetermined fundamental frequency $F_f$. By way of example only, if the first line scan mirror is scanned at a frequency of 4 MHz, the second line scan mirror would optimally be driven at the 12 MHz harmonic. Further, the amplitude of the harmonic frequency would be approximately one tenth of the predetermined amplitude of the fundamental frequency.

Alternatively, when the second line scan mirror 16 is oscillated at a selected frequency $F_s$ which is equal to the fundamental frequency $F_f$, the radiation scanning system 10 is able to generate wider scan angles with respect to the object field 11.

Other elements of the radiation scanning system 10 include the field scan mirror 26, a detector lens 28, and a detector 30. The field scan mirror 26 has a rotational axis FS. The field scan mirror 26, which is oversized in the direction of the rotational axis FS, is driven by a sawtooth waveform. Within the physical and functional constraints of the scanning system 10, the field scan mirror 26 is disposed as close as possible to the second line scan mirror 16 to minimize the amount of pupil shift.

For applications which use only a single line scan mirror the field scan mirror 26 is substituted for the second line scan mirror 16 in the optical configuration. The geometric orientation of the axis of rotation FS of the field scan mirror 26 does not change, but the reflective surface is reorientated by rotation about the rotational axis FS so that the incident radiation from the object field 11 is reflected to intercept the surface of the spherical reflector 12. For systems applications requiring only line scans, e.g., where there is relative movement between the radiation scanning system 10 and the object field 11 or where a single line is to be continuously scanned, the field scan mirror 26 is eliminated from the optical configuration.

The detector 30 is disposed at an object point of the detector lens 28. The disposition of the detector lens 28 with respect to the first line scan mirror 14 and the slotted folding mirror 20 is best explained in terms of an image point of the detector lens 28 by considering the detector 30 as a point object on the optical axis of the radiation scanning system 10 to be imaged by means of the detector lens 28. The converging radiation exiting the detector lens 28 is reflected by the slotted folding mirror 20 and the first line scan mirror 14. The radiation reflected by first line scan mirror 14 converges to form the point image of the detector 30 on the intermediate focal line 13a.

As the first line scan mirror 14 oscillates about the rotational axis FM, the point image of the detector 30 translates back and forth along the intermediate focal line 13a of the spherical reflector 12. Thus, the image point of the detector lens 28 coincides with the intermediate focal line 13a defined by the spherical reflector 12. The optical speed (f-number) of the converging radiation from the detector lens 28 should match the optical speed (f-number) of the spherical reflector 12.

In operation, with the object field 11 sufficiently distant such that radiation therefrom appears essentially as collimated radiation at the radiation scanning system 10, the object field 11 is scanned a field at a time by means of the field scan mirror 26. The sawtooth driven field scan mirror 26 exhibits a scan rate such that the first line scan mirror 14 provides an output of contiguous or near contiguous line scans. Typically, two field patterns are interlaced to provide a complete frame.

The radiation emanating from the object field 11 is reflected from the field scan mirror 26 to the second line scan mirror 16 and reflected therefrom. The collimated radiation reflected from the second line scan mirror 16 is reflected from the first reflecting surface 21a of the slotted folding mirror 20 to the spherical reflector 12.

The radiation reflected from the spherical reflector 12 focuses at the intermediate focal line 13a and passes through the narrow slot 22 of the slotted folded mirror 20. The radiation diverges from the intermediate focal line 13a and is reflected from the first line scan mirror 14 and from the second reflecting surface 21b of the slotted folding mirror 20. The diverging radiation reflected from the slotted folding mirror 20 is refracted by the detector lens 28 and converges to a focus at the detector 30. The width of the narrow slot 22 is minimally sized, but sufficient to allow the reflected radiation to pass through the slotted folding mirror 20. The narrow slot 22 will produce some minor obscuration in the system pupil.

Figure 2:
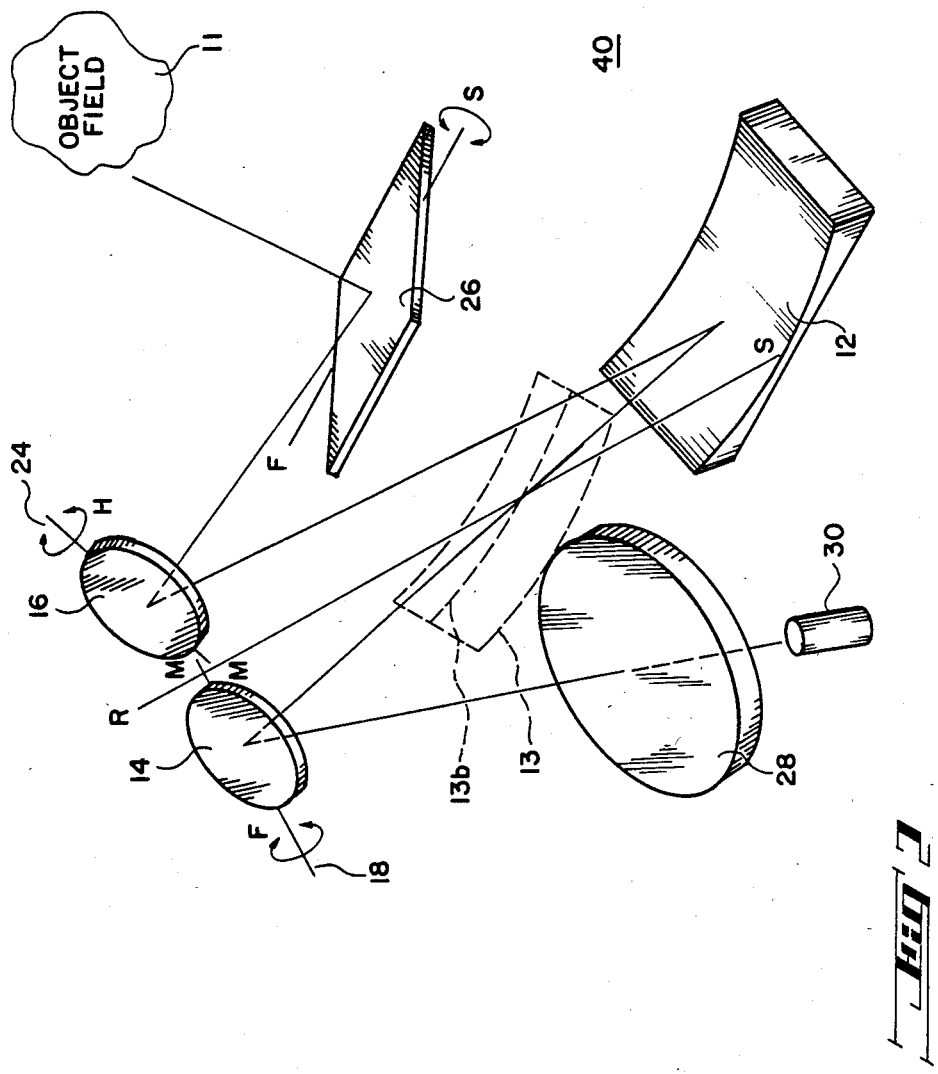
FIG. 2 is a diagrammatic view of another embodiment of an optical configuration for a radiation scanning system according to the present invention.

The optical configuration of another embodiment of a radiation scanning system 40 according to the present invention is diagrammatically depicted in FIG. 2. This scanning system 40 eliminates the slotted folding mirror 20 from the optical configuration of FIG. 1. Eliminating the slotted folding mirror 20 in this embodiment removes two reflective surfaces from the optical configuration as well as eliminating the minor obscuration in the system pupil caused by the narrow slot 22 in the slotted folding mirror 20. But, while there is no central obscuration in this embodiment, there may be some image distortion for larger line scan angles.

The radiation scanning system 40 uses the spherical reflector 12 to relay the pupils of the scan mirrors without pupil shift. The spherical reflector 12 of the radiation scanning system 40 is generally as described hereinabove for the radiation scanning system 10. The relative disposition of the direct optical axis R'S of the spherical reflector 12 with respect to the other elements of the system 40 is shown in FIG. 2, as is the relative spatial orientation of the intermediate focal line 13b.

The scanning system 40 of FIG. 2 utilizes the first line scan mirror 14 and the second line scan mirror 16, mounted on tunable resonant scanners, as described hereinabove. In this embodiment, however, the first and second line scan mirrors 14, 16 are offset from, but adjacent to the direct optical axis R'S of the spherical reflector 12. The reflecting surfaces of the two line scan mirrors 14, 16 are not orthogonal to the direct optical axis R'S.

The reflecting surfaces are perpendicular to the direct optical axis R'S in the direction of rotation at the midpoint scan position, but the axes of rotation FM, HM of the first and second line scan mirrors 14, 16, respectively, must be canted from perpendicularity to the direct optical axis R'S by several degrees so that incident radiation from the field scan mirror 26 is reflected by the second line scan mirror 16 in a direction to intercept the surface of the spherical reflector 12. In turn, the reflected radiation from the spherical reflector 12 incident upon the first line scan mirror 14 is reflected therefrom to intercept the pupil of the detector lens 28. The orientation of the second line scan mirror 16 with respect to the direct optical axis R'S causes the intermediate focal line 13b to intersect the direct optical axis R'S, as illustrated.

The canted orientation of the first line scan mirror 14 with respect to the axis R'S of the spherical reflector 12 may create some minor distortion in the scanned image of the object field 11 in the field scan direction. This type of distortion is sometimes referred to as line scan bow. The amount of distortion for a given scan angle can be lessened, if necessary, by reducing the optical speed (f-number) of the spherical reflector 12. This allows the axis of rotation for the first line scan mirror 14 to be more orthogonal to the optical axis R'S of the spherical reflector 12.

Other elements of the radiation scanning system 40 include the field scan mirror 26, the detector lens 28, and the detector 30 as previously described for the embodiment of FIG. 1. The disposition of the detector lens 28 with respect to the first line scan mirror 14 is again best explained in terms of the object and image points of the detector lens 28 by considering the detector 30 disposed at the object point of the detector lens 28. The detector lens 28 images the detector 30 on the intermediate focal line 13b of the radiation scanning system 40.

Refracted radiation exiting the detector lens 28 is reflected by the first line scan mirror 14 to form the image of the detector 30 at a point on the intermediate focal line 13b. As the first line scan mirror 14 oscillates about the rotational axis FM, the focal point of the detector 30 translates back and forth along the intermediate focal line 13b of the spherical reflector 12. Thus, the image point of the detector lens 28 coincides with the intermediate focal line 13b of the spherical reflector 12.

In operation, with the object field 11 sufficiently distant such that radiation therefrom appears essentially as collimated radiation at the radiation scanning system 40, the object field 11 is scanned a field at a time by means of the field scan mirror 26. The radiation emanating from the object field 11 is reflected from the field scan mirror 26 to the second line scan mirror 16 and reflected therefrom. The collimated radiation reflected from the second line scan mirror 16 is reflected by the spherical reflector 12.

The collimated radiation reflected from the spherical reflector 12 converges to a focus at the intermediate focal line 13b and diverges therefrom to be reflected from the first line scan mirror 14. The diverging radiation reflected from the first line scan mirror 14 is refracted by the detector lens 28 and converges to a focus at the detector 30.

The optical configurations disclosed in the embodiments of FIGS. 1 and 2, respectively, may be utilized, in modified form, to optically couple a single line scan mirror supported on a multi-mode resonant torsional element through the spherical reflector 12. The single multi-mode resonant line scan mirror replaces the first line scan mirror 14 in the optical configurations of FIGS. 1 and 2. The torsional element is oscillated at the predetermined fundamental frequency $F_f$ as well as one or more phase locked harmonics of the fundamental frequency $F_f$ to produce a near linear driving waveform for the single multi-mode resonant line scan mirror. The frequencies of the multi-mode resonant torsional element may be optionally tunable. The field scan mirror 26 is substituted for the second line scan mirror 16 which is eliminated. The geometric orientation of the axis of rotation FS of the field scan mirror 26 is as described hereinabove. The reflective surface of the field scan mirror 26 is rotated about the rotational axis FS so that incident radiation from the object field 11 is reflected in a direction to intercept the surface of the spherical reflector 12.

Alternatively, in yet further embodiments of the present invention, the optical configurations of FIGS. 1 and 2, respectively, may be used, in modified form, to optically couple a line scan mirror mounted on an non-tunable resonant galvanometer through the spherical reflector 12. The single mode line scan mirror replaces the first line scan mirror 14 in FIGS. 1 and 2. The field scan mirror 26 is substituted for the second line scan mirror 16 which is eliminated. The geometric orientation of the axis of rotation FS of the field scan mirror 26 is as described hereinabove. The reflective surface of the field scan mirror 26 is rotated about rotational axis FS so that incident radiation from the object field 11 is reflected by the repositioned field scan mirror 26 to intercept the surface of the spherical reflector 12.

Figure 3:
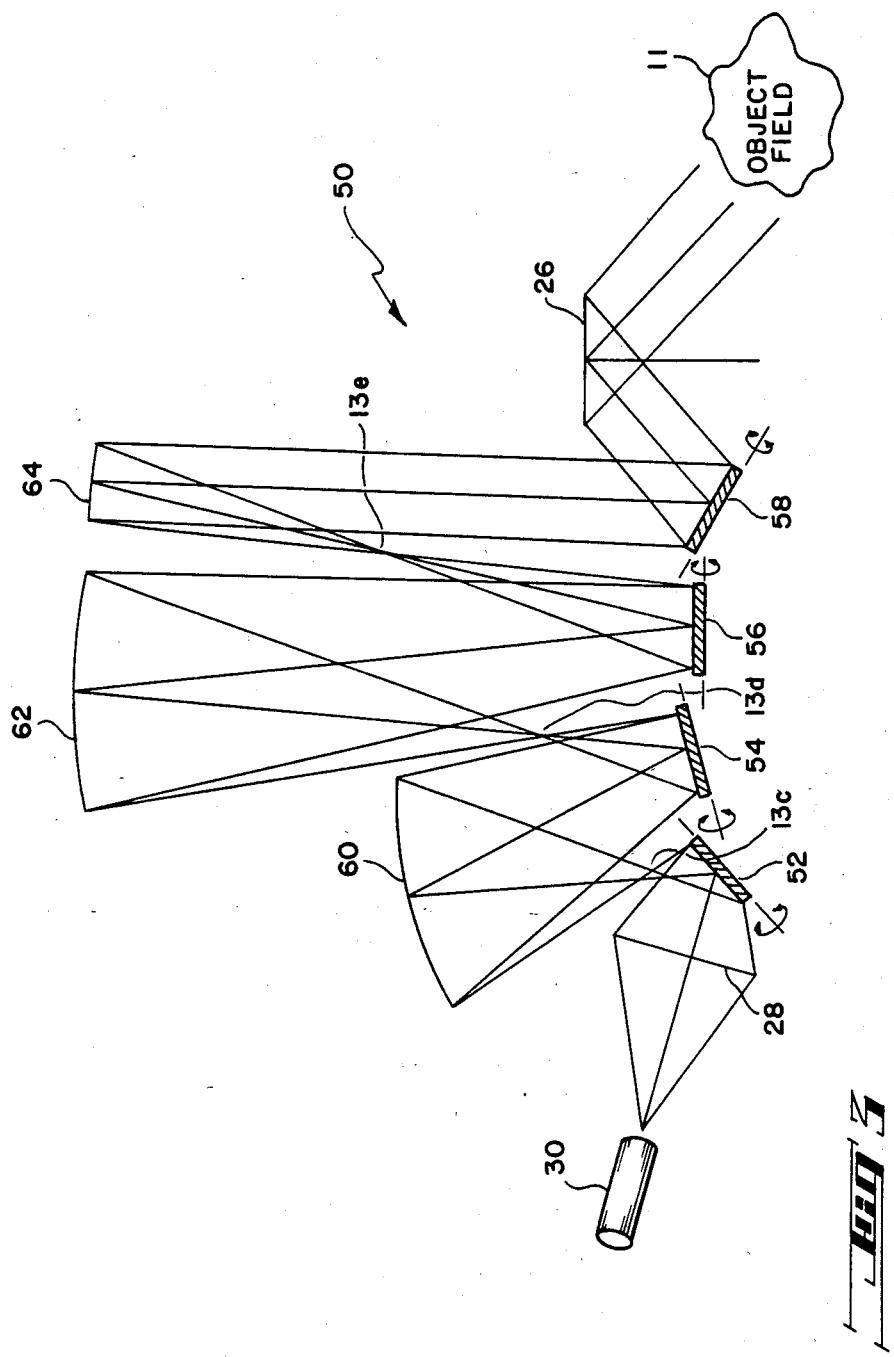
FIG. 3 is a side cross sectional view of yet another embodiment of an optical configuration for a radiation scanning system according to the present invention.

FIG. 3 is a cross sectional view illustrating another embodiment of a radiation scanning system 50 according to the present invention, this scanning system 50 utilizing a set of four cascaded line scan mirrors 52, 54, 56, 58 (two supplementary line scan mirrors, a first line scan mirror and a second line scan mirror, respectively) mounted on tunable resonant scanners and three spherical reflectors 60, 62, 64 (two supplementary spherical reflectors and a spherical reflector, respectively). One specific spherical reflector 60, 62, 64 is interposed between each pair of optically adjacent line scan mirrors 52-54, 54-56, 56-58, respectively, as depicted in FIG. 3.

Each of the line scan mirrors 52, 54, 56, 58 is in a respective plane which, at a mid-scan position, is perpendicular to the plane of the paper. The axis of rotation of line scan mirrors 52, 54, 56, 58 are canted from perpendicularity to the optical axes of the spherical reflectors 60, 62, 64 by several degrees so that the incident radiation from the preceding optical element is reflected in a direction to intercept the surface of the following optical element.

The axis of rotation of line scan mirror 58 is canted to reflect the incident radiation from the field scan mirror 26 to the surface of the spherical reflector 64. The axis of rotation of line scan mirror 56 is canted to reflect incident radiation from spherical reflector 64 to the surface of spherical reflector 62. The axis of rotation of scan mirror 54 is canted to reflect the incident radiation from spherical reflector 62 to the surface of the spherical reflector 60. Finally, the axis of rotation of line scan mirror 52 is canted to reflect the incident radiation from spherical reflector 60 to the pupil of the detector lens 28. In addition, the axis of rotation of each of the line scan mirrors 52, 54, 56, 58 is disposed as close as possible to the center of curvature of the corresponding spherical reflector 60, 62, 64. The axes of rotation for the line scan mirrors 52, 54, 56, 58 in the embodiment depicted in FIG. 3 lie in the plane of the paper.

The field-of-view of this embodiment, in contrast to the fields-of-view of the embodiments previously disclosed hereinabove and as exemplarily illustrated by FIGS. 1 and 2, is increased by a factor of two in both the line scan and field scan directions. This increase in the field-of-view is accomplished without changing the oscillatory amplitude of the line scan mirrors 52, 54, 56, 58. Alternatively, in lieu of increasing the field-of-view of the radiation scanning system 50, the cascade configuration of the line scan mirrors 52, 54, 56, 58 can be utilized to further improve the scan linearity of the system 50 by locking the line scan mirrors 52, 54, 56, 58 to the fundamental frequency and the first, second and third harmonics thereof, respectively. Alternatively, the harmonics may be locked to create a near sawtooth scan as opposed to the near triangular scan.

The embodiment of FIG. 3 exemplarily illustrates a 2:1 object/image ratio for the spherical reflectors 60, 62. Using the basic thin lens optical relationship $$1/\text{focal length} = 1/\text{object distance} + 1/\text{image distance}$$

an object distance of 1.5 times the focal length produces an image distance of 3 times the focal length. For spherical reflector 64 the object distance coincides with the focal length thereof. It is to be understood that other applications may require a different object/image ratio.

The disposition of the elements forming the optical configuration of the radiation scanning system 50 of FIG. 3 is best explained by considering the detector 30 as a point object on the optical axis of the scanning system 50 to be imaged by means of the detector lens 28. The detector lens 28 images the detector 30 at a point on an image focal line 13c after reflection by the second supplementary line scan mirror 52. The image focal line 13c coincides with the object focal line $13c_{60}$ of the second supplementary spherical reflector 60.

The object focal line $13c_{60}$ is a substantially spherical focal surface at a location which in this exemplary embodiment is 1.5 times the focal length of the second supplementary spherical reflector 60. As the second supplementary line scan mirror 52 oscillates, the point image of the detector 30 translates back and forth along the object focal line $13c_{60}$. The converging radiation reflecting from the second supplementary spherical reflector 60 remains directed at the first supplementary line scan mirror 54, disposed at the center of curvature of the second supplementary spherical reflector 60, as the second supplementary line scan mirror 52 oscillates through its full scan angle.

The converging radiation from the second supplementary spherical reflector 60 is directed to focus at the image focal line $13d$ after reflection from the first supplementary line scan mirror 54. The image focal line $13d$ coincides with the object focal line $13d_{62}$ of the first supplementary spherical reflector 62. The object focal line $13d_{62}$ is 3 times the focal length of second supplementary spherical reflector 60 and 1.5 times the focal length of the first supplementary spherical reflector 62. It is a substantially spherical focal surface.

By way of illustration only, the focal length of the first supplementary spherical reflector 62 of this exemplary embodiment is twice as long as the focal length of the second supplementary spherical reflector 60. The focal length of the spherical reflector 64 defines an intermediate object focal line $13e_{64}$ which is coincident with the substantially spherical focal surface of the image focal line $13e$ of the first supplementary spherical reflector 62.

The converging radiation reflecting from the first supplementary spherical reflector 62 remains directed at the first line scan mirror 56 as the first and second supplementary line scan mirrors 54, 52, respectively, oscillate through full scan angles. The converging radiation reflected from the first line scan mirror 56 is directed to focus at the intermediate focal line $13e$.

The collimated radiation reflected from the spherical reflector 64 remains directed at the second line scan mirror 58 as the preceding line scan mirrors 52, 54, 56 oscillate through their respective fields-of-view.

The collimated radiation reflected from the second line scan mirror 58 is directed at the field scan mirror 26, which, like previous embodiments, is oversized in the direction of its axis of rotation. Similarly, the field scan mirror 26 is placed as close as possible to the second line scan mirror 58 to minimize pupil shift.

While the foregoing embodiments have been described in terms of an optical configuration for a passive radiation scanning system, that is one utilizing radiation emitted by the object field 11, it is to be understood that the foregoing optical configurations also have utility in both active and hybrid radiation scanning systems. In an active system, a source of radiation, for example a lasing apparatus, is substituted for the detector 30 depicted in FIGS. 1, 2 and 3 and the optical radiation is transmitted through the optical configuration to be outputted as a collimated beam of radiation, typically rastered, which coacts with a display means, as for example a TV screen.

Figure 4:
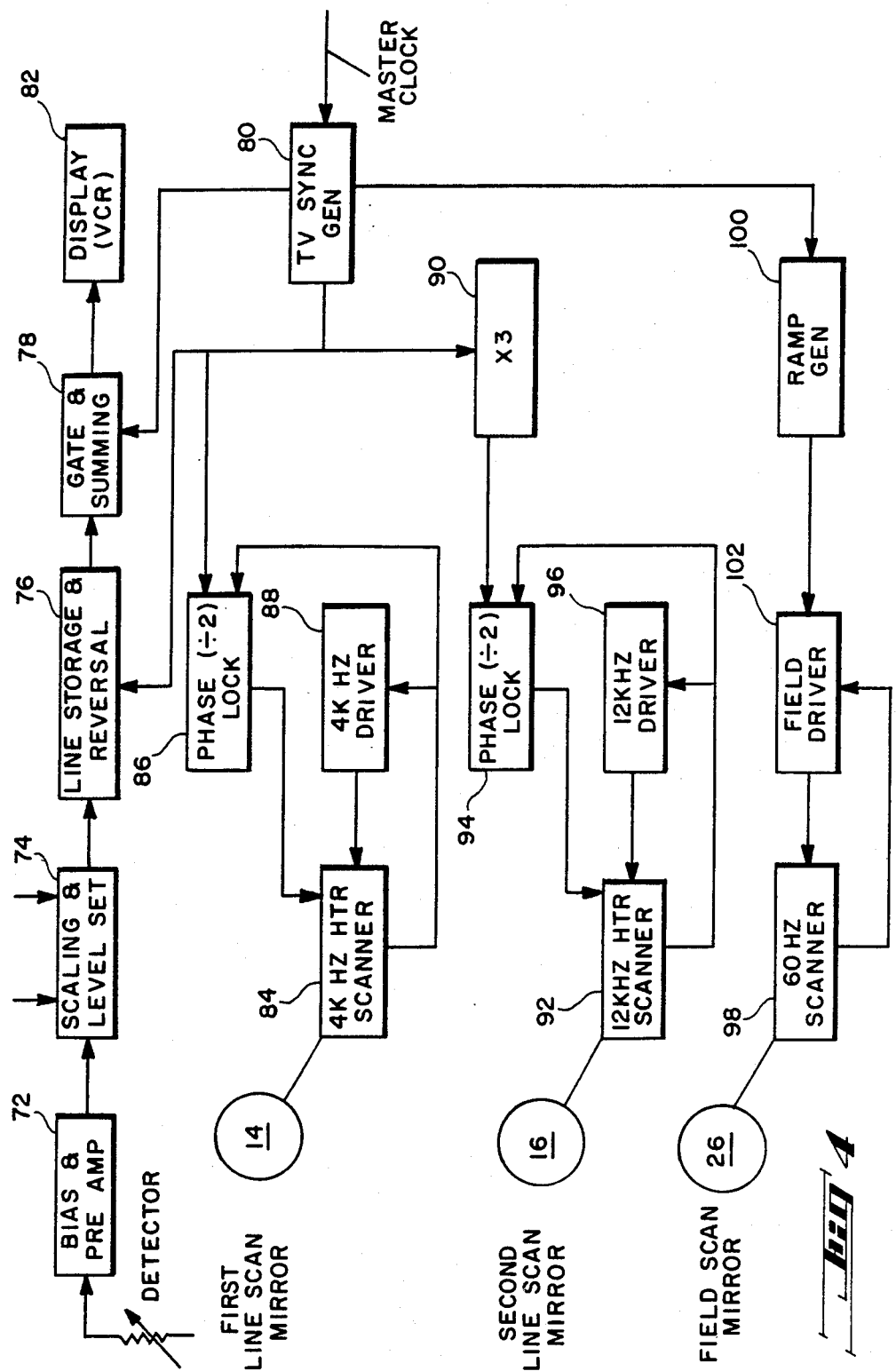
FIG. 4 is a block diagram depicting an electronic control system for interfacing a particular radiation scanning system according to the present invention with conventional TV systems.

One means for controlling a scanning mirror system of the type using two cascaded resonant line scan mirrors 14, 16 oscillating at the predetermined fundamental frequency $F_f$ and the selected frequency $F_s$ which is a harmonic of the predetermined fundamental frequency $F_f$ is illustrated by the block diagram of FIG. 4. The control means illustrated is for a passive system, but the control approach is conceptually the same when applied to an active system. An active system can replace the detector 30 and its associated circuitry with a radiation source having appropriate drive circuitry. Similarly a combined active/passive system can use a single optical scanning system with one set of mirror controls, but with separate controls for the detector and the radiation source.

The detector 30 receives radiation serially from the object field 11 of interest through an optical configuration as depicted by radiation scanning system 10 or 40. A circuit 72 provides appropriate bias and preamplification for the signal generated by the detector 30. A circuit 74 provides a means for level and gain control of the video. The input to the detector 30 is repetitive in the form of left-to-right and right-to-left scan lines, as generated by the approximately linear scan pattern of the line scan mirrors 14, 16.

A circuit 76 stores the line scans as inputted. However, during output the circuit 76 reverses the right-to-left scans so that the output is a series of consecutive left-to-right scan lines. An embodiment of elements comprising the circuit 76 is illustrated in FIG. 5 and will be described in greater detail hereinbelow.

The signal input from the circuit 76 is modified for TV formats with the left-to-right linear scan lines sequentially progressing via the field scan mirror 26 from the top to the bottom of the object field 11. A circuit 78 adds appropriate timing and level information to the signal to formulate a standard composite TV format, which is slaved to the master clock input to the TV sync generator 80. The output of the circuit 78 is then suitable to drive a standard TV display 82.

The TV sync generator 80 provides the timing for synchronizing the two line scan mirrors 14, 16 and the field scan mirror 26. The tunable resonant scanner 84 for the first line scan mirror 14 is frequency controlled and phase locked by the circuit networks 86 and 88, respectively. For the embodiment herein described, the line scan rate of the resonant scanner 84 is one half of the normal TV line rate, i.e., circuit 86 halves the frequency outputted by the TV sync generator 80.

The third harmonic in a Fourier series for a triangular waveform is three times the frequency of the fundamental. Therefore, a circuit 90 multiplies the output of the TV sync generator 80 by a factor of three. In a manner similar to the control used for the first line scan mirror 14, the tunable resonant scanner 92 of the second line scan mirror 16 is frequency controlled and phase locked by the circuit networks 94 and 96, respectively.

The field scanner 98 for the field scan mirror 26 is controlled by the output from the TV sync generator 80. The field scanner 98 is driven in an interlaced sawtooth pattern via a ramp generator 100 and a driver circuit 102. For very high resolution applications it may be desirable to superimpose a high frequency oscillation or dither on the field scanner 98 via the field driver 102 to eliminate spurious information received from the edges of the object field 11. It is a correction for the vertical displacement at the edges of the object field which result from the triangular left-to-right, right-to-left line scans as opposed to the true sawtooth left-to-right TV scan format. This small amplitude dither would be at twice the predetermined fundamental line scan frequency $F_f$.

The line storage and reversal circuit 76 performs two functions. It stores each pixel in each line so that each scan line can be read twice, and it reverses each right-to-left scan line. For the embodiment discussed hereinabove, each scan line must be read twice to compensate for a predetermined fundamental line scan frequency $F_f$ which is half of the standard TV line frequency. Right-to-left line reversal is accomplished simply by reading the R/L RAM 112 on a first-in, last-out basis.

With reference to FIG. 5, each pixel entering the line storage and reversal circuit 76 is digitized by an A/D converter 104. The digitizing rate is set by a write counter 108 which is slaved to the fundamental line drive, that is at one half of the rate outputted from the TV sync generator 80. The digitized output from the A/D converter 104 is directed to a L/R RAM 114 by a switch 106 while the first line scan mirror 14 is scanning left-to-right and to the R/L RAM 112 while the scanner is scanning right-to-left. The RAM address for both RAMs is stepped by the write counter 108 through a switch 110. The write counter 108 resets and the write counter switch 110 cycles at the scan line rate which is one half of the standard TV line rate.

The read counter 118 steps both RAMs through a switch 116 for readout. The read counter 118 resets and the read counter switch 116 cycles at the standard TV line rate. The read output from the RAMs is directed to a D/A converter 122 by a switch 120. While the fundamental line scan mirror 14 is scanning left-to-right the switch 120 is set to read the R/L RAM 112 on a first-in, last-out basis. And conversely, while the first line scan mirror 14 is scanning right-to-left the switch 120 is set to read the L/R RAM 114 on a first-in, first-out basis. The output from the D/A converter 122 is the input to the gate and summing circuit 78.

In the foregoing discussion the first line scan mirror 14 was frequency controlled by an external master clock. Alternatively, radiation scanning systems according to the present invention can be operated at the inherent resonant frequency of the tunable resonant scanner. Foreoptics can be used for applications requiring telescopic or microscopic magnifications. Internal radiance references can be located at an intermediate focal plane when the system is used in applications requiring accurate measurements.

A variety of modifications and variations of the present invention are possible in light of the above teachings. It is therefore to be understood that within the scope of the appended claims, the present invention may be practiced otherwise than as specifically described hereinabove.

What is claimed as new and desired to be secured by letters patent of the United States is:

1. A passive infrared scanning system having high optical throughput for detecting infrared radiation emanating from an object field and providing an output compatible with video display systems, comprising:
   spherical reflecting means for optically relaying pupils along an optical path of said passive infrared scanning system with minimal pupil shift, said spherical reflecting means including a spherical reflecting surface, an optical axis, a predetermined radius of curvature, and a predetermined intermediate focal line;
   second scanning means for coupling radiation emanating from the object field onto said spherical reflecting surface of said spherical reflecting means, said second scanning means including a second rotational axis and an essentially flat reflecting surface adjacent said second rotational axis for oscillatory movement thereabout, and wherein said second scanning means is positioned a distance from said spherical reflecting surface equal to said predetermined radius of curvature;
   wherein the radiation reflected from said spherical reflecting surface converges at said predetermined intermediate focal line and diverges therefrom;
   radiometric reference source means disposed at ends of said predetermined intermediate focal line for calibrating the radiation converging at said predetermined intermediate focal line;
   first scanning means operative for line scanning by intercepting and reflecting the radiation diverging from said predetermined intermediate focal line, said first scanning means including a first rotational axis and an essentially flat reflecting surface adjacent said first rotational axis for oscillatory movement thereabout, and wherein said first scanning means is positioned a distance from said spherical reflecting surface equal to said predetermined radius of curvature; and
   detection means for coupling the divergent radiation reflected from said first scanning means to focalize for detection.

2. The radiation scanning system of claim 1 wherein said detection means further comprises:
   lens means for focalizing the divergent radiation reflected from said first scanning means, said lens means including object and image focal points and wherein said image focal point is coincident with said predetermined intermediate focal line of said spherical reflecting means; and
   detector means positioned at said object focal point of said lens means for processing the focalized radiation from said lens means to provide signal outputs corresponding to intensity levels of the radiation emitted by the object field as detected by said radiation scanning system.

3. The radiation scanning system claim 1 wherein said second scanning means comprises:
   field scan means for scanning the object field in response to a predetermined driving force to couple successive fields of radiation corresponding to the radiation emitted by the object field onto said spherical reflecting surface of said spherical reflecting means; and wherein
   said first scanning means includes a non-tunable resonant scanner having a torsional element coincident with said first rotational axis and having said essentially flat reflecting surface mounted on said torsional element for oscillatory movement to intercept and reflect the radiation diverging from said predetermined intermediate focal line and wherein said non-tunable resonant scanner is configured for oscillatory movement at a predetermined fundamental frequency.

4. The radiation scanning system of claim 3 further comprising slotted folding mirror means having a second reflecting surface for reflecting each of the successive fields of radiation from said field scan means onto said spherical reflecting surface of said spherical reflecting means, said slotted folding mirror means further including narrow slot means transparent to radiation emitted by the object field for passing radiation reflected from said spherical reflecting surface to said non-tunable resonant scanner and a first reflecting surface for reflecting radiation to said detection means.

5. The radiation scanning system claim 1 wherein said second scanning means comprises:

field scan means for scanning the object field in response to a predetermined driving force to couple successive fields of radiation corresponding to the radiation emitted by the object field onto said spherical reflecting surface of said spherical reflecting means; and wherein said first scanning means includes a tunable resonant scanner having a torsional element coincident with said first rotational axis and having said essentially flat reflecting surface mounted on said torsional element for oscillatory movement to intercept and reflect the radiation diverging from said predetermined intermediate focal line, and wherein said tunable resonant scanner is configured for oscillatory movement at a predetermined fundamental frequency and tunable for oscillatory movement within a predetermined frequency range centered about said predetermined fundamental frequency.

6. The radiation scanning system of claim 5 further comprising slotted folding mirror means having a second reflecting surface for reflecting each of the successive fields of radiation from said field scan means onto said spherical reflecting surface of said spherical reflecting means, said slotted folding mirror means further including narrow slot means transparent to radiation emitted by the object field for passing radiation reflected from said spherical reflecting surface to said tunable resonant scanner and a first reflecting surface for reflecting radiation to said detection means.

7. The radiation scanning system of claim 1 wherein said second scanning means comprises:

field scan means for scanning the object field in response to a predetermined driving force to couple successive fields of radiation corresponding to the radiation emitted by the object field onto said spherical reflecting surface of said spherical reflecting means; and wherein said first scanning means includes a tunable multi-mode resonant scanner having a torsional element coincident with said first rotational axis and having said essentially flat reflecting surface mounted on said torsional element for oscillatory movement to intercept and reflect the radiation diverging from said predetermined intermediate focal line, and wherein said tunable multi-mode resonant scanner is configured for oscillatory movement at a predetermined fundamental frequency and at least one harmonic of said predetermined fundamental frequency and tunable for oscillatory movement at predetermined frequencies within a predetermined frequency range centered about said predetermined fundamental frequency and said at least one harmonic thereof, and further wherein said oscillatory movement of said tunable multi-mode resonant scanner is a phase locked oscillatory movement of said torsional element in combination at said predetermined frequencies.

8. The radiation scanning system of claim 7 further comprising slotted folding mirror means having a second reflecting surface for reflecting each of the successive fields of radiation from said field scan means onto said spherical reflecting surface of said spherical reflecting means, said slotted folding mirror means further including narrow slot means transparent to radiation emitted by the object field for passing radiation reflected from said spherical reflecting surface to said tunable multi-mode resonant scanner and a first reflecting surface for reflecting radiation to said detection means.

9. The radiation scanning system claim 1 wherein said first scanning means comprises:

a first tunable resonant scanner having a torsional element coincident with said first rotational axis and having said essentially flat reflecting surface mounted on said torsional element for oscillatory movement to intercept and reflect the radiation diverging from said predetermined intermediate focal line, and wherein said first tunable resonant scanner is configured for oscillatory movement at a predetermined fundamental frequency and tunable for oscillatory movement within a predetermined frequency range centered about said predetermined fundamental frequency; and wherein said second scanning means comprises:

a second tunable resonant scanner having a torsional element coincident with said second rotational axis and having said essentially flat reflecting surface mounted on said torsional element for oscillatory movement to couple radiation emanating from the object field onto said spherical reflecting surface of said spherical reflecting means, and wherein said second tunable resonant scanner is configured for oscillatory movement at a predetermined selected frequency and tunable for oscillatory movement within a predetermined frequency range centered about said predetermined selected frequency; and wherein said oscillatory movement of said second tunable resonant scanner is phase locked with said oscillatory movement of said first tunable resonant scanner.

10. The radiation scanning system of claim 9 wherein said predetermined selected frequency is said predetermined fundamental frequency.

11. The radiation scanning system of claim 9 wherein said predetermined selected frequency is a harmonic of said predetermined fundamental frequency.

12. The radiation scanning system of claim 9 further comprising slotted folding mirror means having a second reflecting surface for reflecting radiation from said second tunable resonant scanner onto said spherical reflecting surface of said spherical reflecting means, said slotted folding mirror means further including narrow slot means transparent to radiation emitted by the object field for passing radiation reflected from said spherical reflecting surface to said first tunable resonant scanner and a first reflecting surface for reflecting radiation to said detection means.

13. The radiation scanning system of claim 1 further comprising field scan means for scanning the object field in response to a predetermined driving force to reflect successive fields of radiation emanating from said object field onto said second scanning means, said field scan means including a third rotational axis and an essentially flat reflecting surface adjacent said rotational axis for angular movement thereabout, and wherein said field scan means is positioned near said second scanning means.

14. The radiation scanning system of claim 13 wherein said first scanning means comprises:

a first tunable resonant scanner having a torsional element coincident with said first rotational axis and having said essentially flat reflecting surface mounted on said torsional element for oscillatory movement to intercept and reflect the radiation diverging from said predetermined intermediate focal line, and wherein said first tunable resonant scanner is configured for oscillatory movement at a predetermined fundamental frequency and tunable for oscillatory movement within a predetermined frequency range centered about said predetermined fundamental frequency; and wherein said second scanning means comprises:

a second tunable resonant scanner having a torsional element coincident with said second rotational axis and having said essentially flat reflecting surface mounted on said torsional element for oscillatory movement to couple the successive fields of radiation from said field scan means onto said spherical reflecting surface of said spherical reflecting means as successive lines of radiation, and wherein said second tunable resonant scanner is configured for oscillatory movement at a predetermined selected frequency and tunable for oscillatory movement within a predetermined frequency range centered about said predetermined selected frequency; and wherein said oscillatory movement of said second tunable resonant scanner is phase locked with said oscillatory movement of said first tunable resonant scanner.

15. The radiation scanning system of claim 14 further comprising slotted folding mirror means having a second reflecting surface for reflecting each of the successive lines of radiation from said second tunable resonant scanner onto said spherical reflecting surface of said spherical reflecting means, said slotted folded mirror means further including narrow slot means transparent to radiation emitted by the object field for passing radiation reflected from said spherical reflecting surface to said first tunable resonant scanner and a first reflecting surface for reflecting radiation to said detection means.

16. The radiation scanning system of claim 14 wherein said predetermined selected frequency is said predetermined fundamental frequency.

17. The radiation scanning system of claim 14 wherein said predetermined selected frequency is a harmonic of said predetermined fundamental frequency.

18. The radiation scanning system of claim 1 further comprising:

n supplementary spherical reflecting means disposed intermediate said first scanning means and said detection means along said optical path of said radiation scanning system for optically relaying pupils along said optical path of said radiation scanning system with minimal pupil shift, each of said n supplementary spherical reflecting means including a spherical reflecting surface, an optical axis, a predetermined center of curvature, a predetermined object focal line and a predetermined image focal line, and wherein said predetermined image focal line of said first supplementary spherical reflecting means of said n supplementary spherical reflecting means is optically coincident with said predetermined intermediate focal line of said spherical reflecting means;

wherein divergent radiation reflected from said first scanning means is reflected from said spherical reflecting surface of said first supplementary spherical reflecting means to converge at said predetermined object focal line thereof and to diverge therefrom; and n supplementary scanning means for coupling radiation along said optical path of said radiation scanning system, said n supplementary scanning means disposed along said optical path of said radiation scanning system intermediate said spherical reflecting surface of said first supplementary spherical reflecting means and said detection means; and wherein said nth supplementary scanning means of said n supplementary scanning means couples the radiation diverging from said predetermined object focal line of said optically preceding supplementary spherical reflecting means to said detection means;

wherein when n=1 said optically preceding supplementary spherical reflecting means is said first supplementary spherical reflecting means, and when n>1 each of said n supplementary scanning means except said nth supplementary scanning means is optically interposed between a preceding supplementary spherical reflecting means and a succeeding supplementary spherical reflecting means to optically couple radiation from said preceding supplementary spherical reflecting means to said succeeding supplementary spherical reflecting means, said predetermined object focal line of said preceding supplementary spherical reflecting means coinciding with said predetermined image focal line of said succeeding supplementary spherical reflecting means;

wherein radiation reflected from said preceding supplementary spherical reflecting means converges at said predetermined object focal line thereof and diverges therefrom, said predetermined object focal line being coincident with said predetermined image focal line of said succeeding supplementary spherical reflecting means, and is reflected from said interposed supplementary scanning means onto said succeeding supplementary spherical reflecting means and wherein said interposed supplementary scanning means is positioned nearely concurrent with said predetermined centers of curvature of said preceding supplementary spherical reflecting means and said succeeding supplementary spherical reflecting means.

19. The radiation scanning system claim 18 wherein each said first and second scanning means and said n supplementary scanning means is a tunable resonant scanner having a torsional element coincident with said rotational axis and having said essentially flat reflecting surface mounted on said torsional element for oscillatory movement to couple radiation along said optical path of said radiation scanning system, and wherein at least one of said tunable resonant scanners of said first, second and n supplementary scanning means is fabricated for oscillatory movement at a predetermined fundamental frequency and tunable for oscillatory movement within a predetermined frequency range centered about said predetermined fundamental frequency and wherein the remainder of said tunable resonant scanners of said first, second and n supplementary scanning means are fabricated for oscillatory movement at at least one harmonic of said predetermined fundamental frequency and tunable for oscillatory movement within a predetermined frequency range centered about said at least one harmonic, and further wherein oscillatory movement of the remainder of said tunable resonant scanners is phase locked with said oscillatory movement of said at least one of said tunable resonant scanners.

20. The radiation scanning system of claim 19 further comprising:

field scan means positioned near said second scanning means for scanning the object field in response to a predetermined driving force to couple successive fields of radiation emanating from said object field onto said second scanning means, said field scan means including a rotational axis and an essentially flat reflecting surface adjacent said rotational axis for angular movement thereabout in response to said predetermined driving force.

* * * * *

UNITED STATES PATENT AND TRADEMARK OFFICE
CERTIFICATE OF CORRECTION

PATENT NO. : 4,902,893

DATED : February 20, 1990

INVENTOR(S) : Gordon J. Burrer

It is certified that error appears in the above-identified patent and that said Letters Patent is hereby corrected as shown below:

In the Abstract, line 7, "hamonics" should read --harmonic--.

In Column 3, line 26, "R'S" should read --RS--.
In Column 3, line 43, "R'S" should read --RS--.
In Column 3, line 64, "R'S" should read --RS--.
In Column 4, line 2, "R'S" should read --RS--.
In Column 4, line 9, "R'S" should read --RS--.
In Column 6, line 13, "R'S" should read --RS--.
In Column 6, line 22, "R'S" should read --RS--.
In Column 6, line 25, "R'S" should read --RS--.
In Column 6, line 27, "R'S" should read --RS--.
In Column 6, line 31, "R'S" should read --RS--.
In Column 6, line 39, "R'S" should read --RS--.
In Column 6, line 41, "R'S" should read --RS--.
In Column 6, line 43, "R'S" should read --RS--.
In Column 6, line 51, "R'S" should read --RS--.
In Column 12, line 3, "system claim 1" should read --system of claim 1--.
In Column 12, line 52, "line and" should read --line, and--.
In Column 12, line 67, "system claim 1" should read --system of claim 1--.
In Column 14, line 3, "system claim 1" should read --system of claim 1--.
In Column 4, line 47, "MHz" should read --KHz--.

UNITED STATES PATENT AND TRADEMARK OFFICE
CERTIFICATE OF CORRECTION

PATENT NO. : 4,902,893
DATED : February 20, 1990
INVENTOR(S) : Gordon J. Burrer

It is certified that error appears in the above-identified patent and that said Letters Patent is hereby corrected as shown below:

Column 4, line 48, "MHz" should read --KHz--.

Signed and Sealed this

Twenty-first Day of July, 1992

Attest:

DOUGLAS B. COMER

*Attesting Officer*  *Acting Commissioner of Patents and Trademarks*